United States Patent
Köhler

(10) Patent No.: US 11,815,392 B2
(45) Date of Patent: Nov. 14, 2023

(54) SELF-LEVELLING PIERCING SENSOR IN A LIGHT GUIDE CABLE PLUG CONNECTION

(71) Applicant: II-VI Incorporated, Saxonburg, PA (US)

(72) Inventor: Gunnar Köhler, Kleinmachnow (DE)

(73) Assignee: II-VI DELAWARE, INC., Wilmington, DE (US)

( * ) Notice: Subject to any disclaimer, the term of this patent is extended or adjusted under 35 U.S.C. 154(b) by 460 days.

(21) Appl. No.: 16/791,709

(22) Filed: Feb. 14, 2020

(65) Prior Publication Data
US 2020/0298334 A1 Sep. 24, 2020

(30) Foreign Application Priority Data
Mar. 19, 2019 (DE) .............. 10 2019 106 954.8

(51) Int. Cl.
 *G01J 1/42* (2006.01)
 *B23K 26/70* (2014.01)
 *G01J 3/28* (2006.01)
 *G06F 3/042* (2006.01)

(52) U.S. Cl.
 CPC .......... *G01J 1/4257* (2013.01); *B23K 26/705* (2015.10); *G01J 3/2803* (2013.01); *G06F 3/042* (2013.01)

(58) Field of Classification Search
 CPC .... G01J 1/4257; G01J 3/2803; B23K 26/705; G06F 3/042
 See application file for complete search history.

(56) References Cited

U.S. PATENT DOCUMENTS

| 4,423,726 A | * | 1/1984 | Imagawa | .................. H01S 3/13 606/2 |
| 4,777,341 A | | 10/1988 | Steen et al. | |
| 2014/0034614 A1 | * | 2/2014 | Sbetti | ................. B23K 26/1476 219/74 |
| 2018/0188544 A1 | | 7/2018 | Gross et al. | |

FOREIGN PATENT DOCUMENTS

| EP | 2 795 282 B1 | 10/2018 |
| JP | H02165886 A | 6/1990 |
| JP | 200744739 A | 2/2007 |

OTHER PUBLICATIONS

First Office Action in counterpart German Appl. DE102019106954.8, dated Feb. 8, 2021.

\* cited by examiner

*Primary Examiner* — David P Porta
*Assistant Examiner* — Casey Bryant
(74) *Attorney, Agent, or Firm* — Blank Rome LLP

(57) ABSTRACT

A sensor arrangement/evaluation which allows piercing detection within a fiber optic cable connector by means of two photodetectors independent of power, pulse frequency and pulse length.

22 Claims, 6 Drawing Sheets

SELF-LEVELLING PIERCING SENSOR IN A LIGHT GUIDE CABLE PLUG CONNECTION

CROSS-REFERENCE TO RELATED APPLICATIONS

The present application claims priority to German Patent Application No. DE 10 2019 106 954.8 filed on Mar. 19, 2019. The aforementioned application is hereby incorporated by reference in its entirety.

BACKGROUND OF THE INVENTION

Field of the Invention

The invention relates to a sensor arrangement/evaluation which allows piercing detection within a fiber optic cable connector independent of power, pulse frequency, and pulse length.

Brief Description of the Related Art

Process control is becoming more and more important in the laser material processing of metals or other materials. Especially, when cutting strongly structured sheets, which require frequent "piercing"—in the following called piercing—the processing time can be reduced considerably with a reliable piercing detection. Because in this case, the sum of all piercing procedures takes a significant part of the total processing time. To reduce these times to a minimum, so-called piercing sensors are used. These usually use the laser and/or process light reflected by the workpiece. The detection of the reflected light is currently carried out at various points in the solutions known from the state of the art.

For example, the light reflected by the optical fiber is measured in the laser or the coupling in an optical cable. This signal is transmitted to the system control. Because the preselected laser power and any pulse parameters are known in the system control, this strongly fluctuating signal can be evaluated. The signal runtime already plays a considerable role, because piercing processes are usually carried out in a pulsed manner.

Photodetectors below the workpiece detect passing laser radiation. Together with a back-reflective sensor within the laser, two opposing signal changes taking place shortly after each other can be used in this way to detect a successful piercing. This method already allows for control without exact knowledge of the laser parameters. The disadvantage is, however, that signal characteristics depend on the positioning of the photodetectors below the workpiece. In addition, areas of the workpiece that have already been cut out can transmit scattered light to the detectors and thus negatively influence the signal-to-noise ratio. Usually, the area underneath the workpiece is exposed to strong contamination, so that the detectors are also contaminated. This also has a negative effect on the signal-to-noise ratio.

Within the cutting optics, a part of the radiation reflected from the workpiece is deflected via a mirror onto a photodetector. If the evaluation electronics of the cutting optics do not work together with the laser and the system control, the process parameters are not available and cannot be used for the interpretation or classification of the signals. Therefore, one can only deduce material penetration from the time course over a certain period of time, for example over the last 5 pulses.

According to the sampling theorem of Nyquist and Shannon, however, the sampling frequency at which the laser pulses are detected must be more than twice the pulse frequency of the laser. However, in order to detect signals with as little error as possible, one will have to work with much higher clock rates in practice. This places high demands on signal processing and transmission. In spite of the high effort involved in signal processing, however, only changes that are at least five times slower than the pulse frequency of the laser can be detected, since one must look back far enough to be able to detect an event reliably. In addition, fluctuations in the angle of the laser light beam from the optical fiber, contamination on lenses, protective glass or on the end cap surface of the optical cable can cause considerable stray light within the cutting optics and thus have a negative effect on the signal-to-noise ratio.

An evaluation of laser process signals within a fiber optic cable connector for rapid shutdown of the laser in case of destruction or significant degradation of the fiber optic cable reveals published European Patent No. EP 2 795 282 BI. It also refers to a possible use for quality control and process control in the broadest sense.

The evaluation according to published European Patent No. EP 2 795 282 BI uses scattered laser light, which is conducted from the optical space of the fiber optic cable connector via a capillary concentric to the fiber into the rear area of the connector. There, the scattered light from the optical space of the connector as well as scattered light emerging radially from the fiber is measured with three photodetectors, each of which detects different wavelength ranges (UV, VIS, IR). However, a direct conclusion on the origin of the scattered light is not possible in this way. Therefore, without knowledge of the laser parameters, with the IR-sensitive photodetector alone, this method cannot distinguish between laser light coming from the laser and laser light reflected from the workpiece. Only the additional evaluation of other wavelengths by UV-/VIS-sensitive photodetectors makes a differentiation possible, since other wavelengths than the laser wavelength (apart from the pump wavelength of the laser) will essentially be process light emitted by the workpiece.

Published European patent No. EP 2 795 282 BI also reveals the possibility of differentiating between laser light coming from the laser and laser light reflected from the workpiece by comparing the scattered light signals from the input-side fiber optic cable connector with those from the output-side fiber optic cable connector. This is possible because light backscattered from the process is present at both connectors, but the signal level at the output fiber optic cable connector will be higher. If this behavior is to be used for piercing detection, however, this requires a fast signal transmission and signal correlation between both connectors with a time resolution of less than 10 ms. Thus, the costs of a piercing sensor integrated in the fiber optic cable are significantly increased.

SUMMARY OF THE INVENTION

An object of the present invention is to provide a sensor arrangement which is capable of delivering a piercing signal independent of power, pulse frequency, and pulse length, wherein no sensor is to be used outside the beam guiding system consisting of laser, coupling, optical fiber cable or processing optics.

The present invention provides a device for detecting a piercing signal during a laser cutting process, comprising a. an aperture within a fiber-optic cable connector for separating radiation arriving at the output end of a fiber-optic cable connected to the fiber-optic cable connector and radiation reflected back from the workpiece, and
b. at least two photodetectors, a first photodetector being arranged behind an aperture for measuring the radiation which arrives at the output end of an optical cable connected to the optical cable connector, and a second photodetector being arranged in front of the aperture for measuring the radiation which is reflected back from the workpiece.

In a further aspect of the invention, it is provided that an adhesive bonding or support of the radiation-conducting optical fiber of the optical cable may be the aperture for separating the radiation.

In a further embodiment of the device according to the invention, it may comprise a circuit for the correlation of the measured radiation for the detection of a laser piercing process.

Furthermore, according to the invention, it may be provided that the circuit for the correlation of the measured radiation is arranged within the optical fiber cable connector.

In a further aspect of the device according to the invention, the circuit for correlating the measured radiation may include a comparator circuit.

Furthermore, the circuit for correlation of the measured radiation can be connected to a signal conductor, whereby the signal conductor can be a BUS system The signal conductor and/or BUS system can be connected to a control unit of the laser cutting process, so that the process can be controlled depending on the result of the correlation of the signals of the first and second photodetector.

In a further version of the device according to the invention, at least one photodetector can be connected to a rear part of the optical fiber cable connector via an opening that is not arranged concentrically to the optical element supplying the radiation.

In another version, the opening can be closed with an optically transparent element to prevent dust or moisture from entering the fiber optic cable connector.

It is further provided that the optical element may be an optical fiber, a lens or a glass cylinder.

The invention further relates to a method for determining a piercing signal during a laser cutting process comprising the steps
a. Measurement of radiation arriving at the output end of an optical cable connected to an optical cable connector by means of a first photodetector behind an aperture located inside the optical cable connector, and
b. Measurement of radiation reflected back from the workpiece by means of a second photodetector, in front of the aperture located inside the fiber optic cable connector.

In a further aspect, the method may include the step of correlating the signals of the measured radiation of the first and second photodetectors in the fiber optic cable connector by means of a comparator circuit.

Furthermore, the process uses an adhesive bonding or holding device for the optical fiber of the optical cable to be supplied with radiation.

Furthermore, c whereby the first signal conductor can be a BUS system.

Furthermore, the radiation measured by the two photodetectors can be used to generate a piercing signal.

According to the invention, a further version of the method provides that a piercing signal, i.e. the result of the correlation of the signals of the measured radiation is transmitted through the first and second photodetector by means of a second signal conductor within the optical fiber cable.

Still other aspects, features, and advantages of the present invention are readily apparent from the following detailed description, simply by illustrating preferable embodiments and implementations. The present invention is also capable of other and different embodiments and its several details can be modified in various obvious respects, all without departing from the spirit and scope of the present invention. Accordingly, the drawings and descriptions are to be regarded as illustrative in nature, and not as restrictive. Additional objects and advantages of the invention will be set forth in part in the description which follows.

BRIEF DESCRIPTION OF THE FIGURES

The invention will be described based on figures. It will be understood that the embodiments and aspects of the invention described in the figures are only examples and do not limit the protective scope of the claims in any way. The invention is defined by the claims and their equivalents. It will be understood that features of one aspect or embodiment of the invention can be combined with a feature of a different aspect or aspects of other embodiments of the invention, in which:

DETAILED DESCRIPTION OF THE INVENTION

The previously formulated object of the invention is solved by the features of the independent claims. The dependent claims cover further specific embodiments of the invention.

The invention provides a device which is capable of quickly and reliably detecting piercing performed during a laser cutting process with only two photodetectors within a fiber optic cable connector, regardless of the laser parameters set.

For the purposes of the present invention, a fiber-optic cable connector is to be understood as a connection for fiber-optic cables, preferably a plug connection. One part of a plug connection may have a receptacle or also a female part and the other part of a plug connection may have a so-called male part. Fiber optic cable connectors serve to connect optical fibers or the ends of optical cables so that optical radiation of one optical cable or the optical fiber arranged therein is coupled into the optical fiber of another optical cable.

According to the invention, this is solved by using the fiber bond as a near-field aperture to perform a signal separation between the radiation coming from the laser (hereinafter referred to as useful radiation) and the radiation reflected back from the workpiece (hereinafter referred to as process scatter radiation).

An essential advantage of the present invention is that, in contrast to a signal correlation between input and output fiber-optic cable connector, as known from the state of the art, the analog signal processing already takes place within a fiber-optic cable connector, so that no rapid signal correlation has to be carried out over many meters between input and output fiber-optic cable connector. The correlation of the scattered light signals takes place within a fiber optic cable connector. Only the piercing signal as a result of this correlation must be transmitted to the higher-level system control via a signal conductor, e.g. a BUS system. Thus, the frequency of the transmitted signal can be considerably lower than it would be necessary for a correlation of two scattered light signals. This transmission can take place within the fiber-optic cable.

Figure 1:
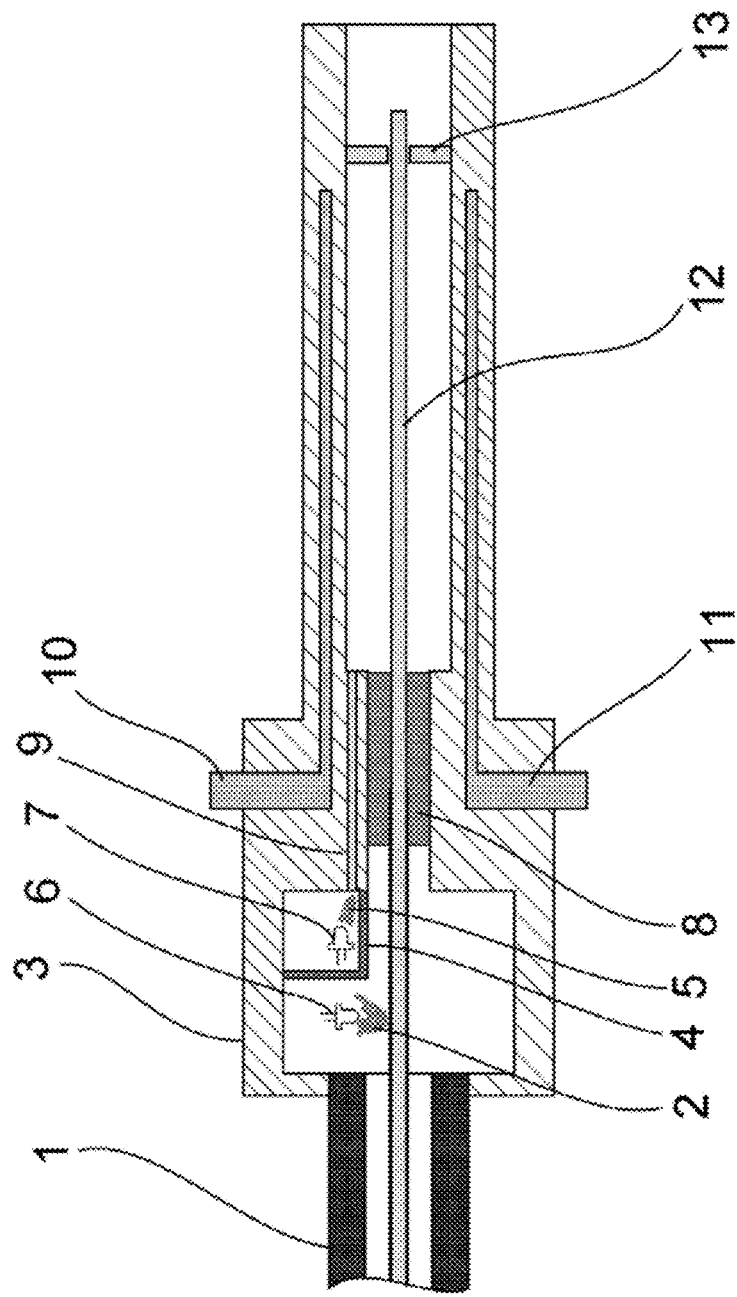
FIG. 1 shows a schematic structure of a fiber optic cable connector according to the invention.

FIG. 1 shows the schematic structure of a device according to the invention in a version of a fiber optic cable connector with a housing 3, which is cooled. For this purpose, cooling water flows through the cooling water supply 10 to the cooling water return 11, both of which are arranged inside the housing 3 of the fiber optic cable connector.

At one end of the housing 3 of the fiber optic cable connector, the fiber optic cable 12 is led into the housing 3 surrounded by a fiber optic cable protection tube 1. A first detector 6, e.g., a photodetector, is arranged in the area where the optical fiber 12 enters the housing 3 of the fiber optic cable connector to measure scattered light 2 of the useful light at the first detector 6.

At the opposite end of the fiber optic cable connector is its receptacle, for example, for another fiber optic cable connector or the optics of a laser material processing head. The optical fiber 12 is centered and held in the optical cable connector by means of a fiber centering device 13. Furthermore, the optical fiber 12 is held in place by fiber bonding 8 in the housing of the optical cable connector at the inner end of the optical cable connector receptacle. The centering of the optical fiber 12 can also be achieved by means of an end cap spliced to the optical fiber (not shown).

Next to the fiber bonding 8, there is an opening 9 for process scattered light 5 to pass to a second detector 7, because the fiber bonding 8 is in contact with the housing 3 of the fiber optic cable connector and thus seals it in this area of the fiber optic cable connector tightly to the opening of the receptacle. On the side of the opening 9 for process scattered light 5 facing away from the housing 3, the second detector 7, e.g., a photodetector, for measuring the process scattered light 5 is arranged in a detector shield 4.

Useful radiation 14 (FIG. 2), which arrives at the output end of the fiber-optic cable, has already been optically filtered several times. Precise coupling into the fiber core of the optical fiber 12 first ensures that as little light as possible is present in the fiber cladding. Parts of the useful radiation 14 that are coupled into the fiber cladding are attenuated by cladding mode strippers. The input-side of fiber bonding 8 further reduces the remaining radiation residue. Parts of the useful radiation 14, which have been coupled into the core of the optical fiber 12 but whose numerical aperture is too large to be guided by the optical fiber 12, also leave the core and experience a corresponding attenuation in the fiber cladding. This also applies to residual radiation in the fiber cladding, which can no longer be guided by the fiber cladding. Over the length of the fiber optic cable—usually 20 m or more—this portion is broken out of the fiber optic cable.

Useful radiation 14, which leaves the fiber optic cable on the output side, passes through optical systems of the processing optics 18 and then hits the workpiece surface 19 as a focused laser beam 20, from where the process scattered radiation 17 (FIG. 2) is emitted, which is coupled into the fiber sheath at the output end of the fiber optic cable. Process scattered radiation 17, which couples into the fiber sheath or violates the boundary conditions for a guide in the fiber core, is also significantly attenuated, comparable to that on the input side. The scattered light 2 (FIG. 1) emerging radially from the fiber 12 behind the fiber bonding 8 (FIG. 1) of the output-side fiber optic cable connector will be only slightly increased by this process scattered radiation 17. Thus, a relatively acidic scattered light signal will be found in the output-side fiber optic cable connector if the first detector 6 (FIG. 1) is positioned at this point. The situation is completely different in the area before the fiber bonding 8. Process scattered radiation 17, which couples into the fiber cladding, is guided out of the fiber by means of an enveloping mode scraper into the absorber area of the fiber optic cable connector (FIG. 2) surrounding the fiber.

Figure 2:
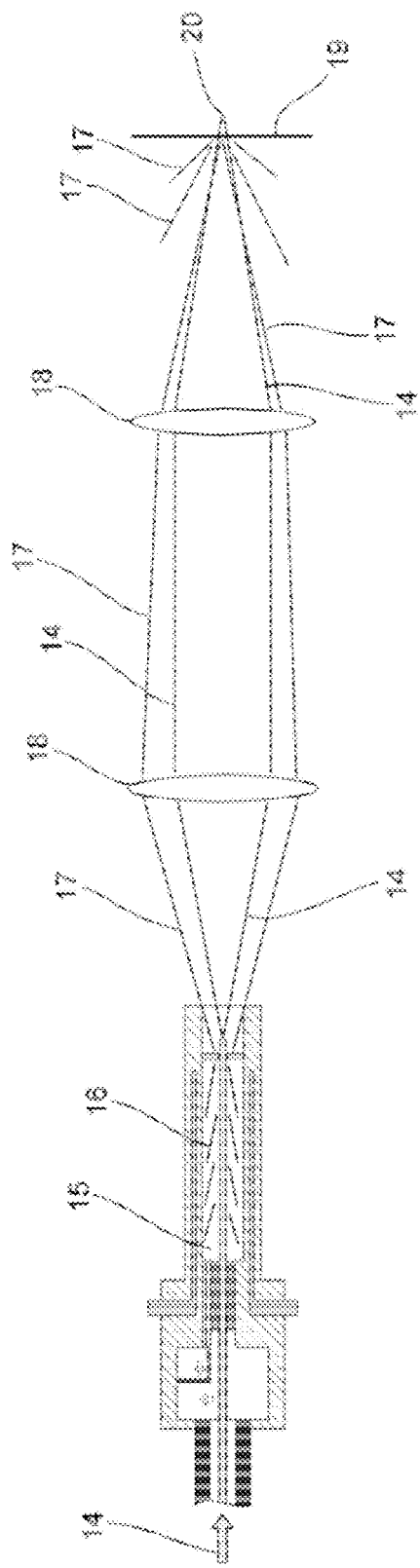
FIG. 2 shows a schematic representation of useful radiation and process scatter radiation.

Process scattered radiation 17, which neither hits the fiber core nor the fiber cladding, reaches the absorber area 15 directly (FIG. 2). There it is absorbed by absorbing surfaces and is usually removed by an active water cooling system with cooling water supply 10 and cooling water return 11 (FIG. 1). The level of scattered light will therefore be many times higher in the case of process scattered light occurring in the absorber area 15 of the fiber optic cable connector than behind the fiber bonding 8. The fiber bonding 8 acts as a near-field diaphragm. A comparably effective separation of useful radiation 14 and process scattered radiation 17 is only found at this point in the entire optical transmission chain from the active laser medium to the workpiece. So, if process scattered light 5 is measured with a second photodetector 7 (FIG. 1) in the absorber area 15 of the output-side fiber optic cable connector 5 (FIG. 1), process scattered radiation 17 is usually measured mainly. Because the essential damping mechanisms for this process scattered radiation 17—related to the fiber optic cable—take place in this absorber area 15, this scattered light signal reacts very sensitively to any kind of reflection from the workpiece.

However, fluctuations in this signal do not only depend on the occurrence of process scattered radiation 17. A significant influencing factor is the absolute amount of useful power radiated onto the workpiece and its temporal course. If, for example, the signal level of the process scattered radiation 17 in the absorber area 15 suddenly increases by a factor of 3, it is not possible to determine without knowledge of the absolute level of the irradiated useful power whether this was caused by three times higher backscatter or three times higher irradiated useful power.

The same applies to pulsed laser operation, which is usually present during the piercing process. Here the effective power varies with high frequency between 0 W and several 1000 W. However, if the signal of scattered light 2 of the first photodetector 6 is used to determine the level of the useful signal and its temporal course and this information is correlated with the signal of process scattered light 5 of the second photodetector 7, this allows an evaluation of the process scattered radiation 17 even without knowledge of the laser parameters, because the respective reference value is part of the measuring system and is always determined synchronously. Likewise, the first photodetector 6 can be used for filtering the signal from the second photodetector 7, if its signal is used as input of an amplifier circuit. In this way, disturbing noise signals can be suppressed.

Figure 3:
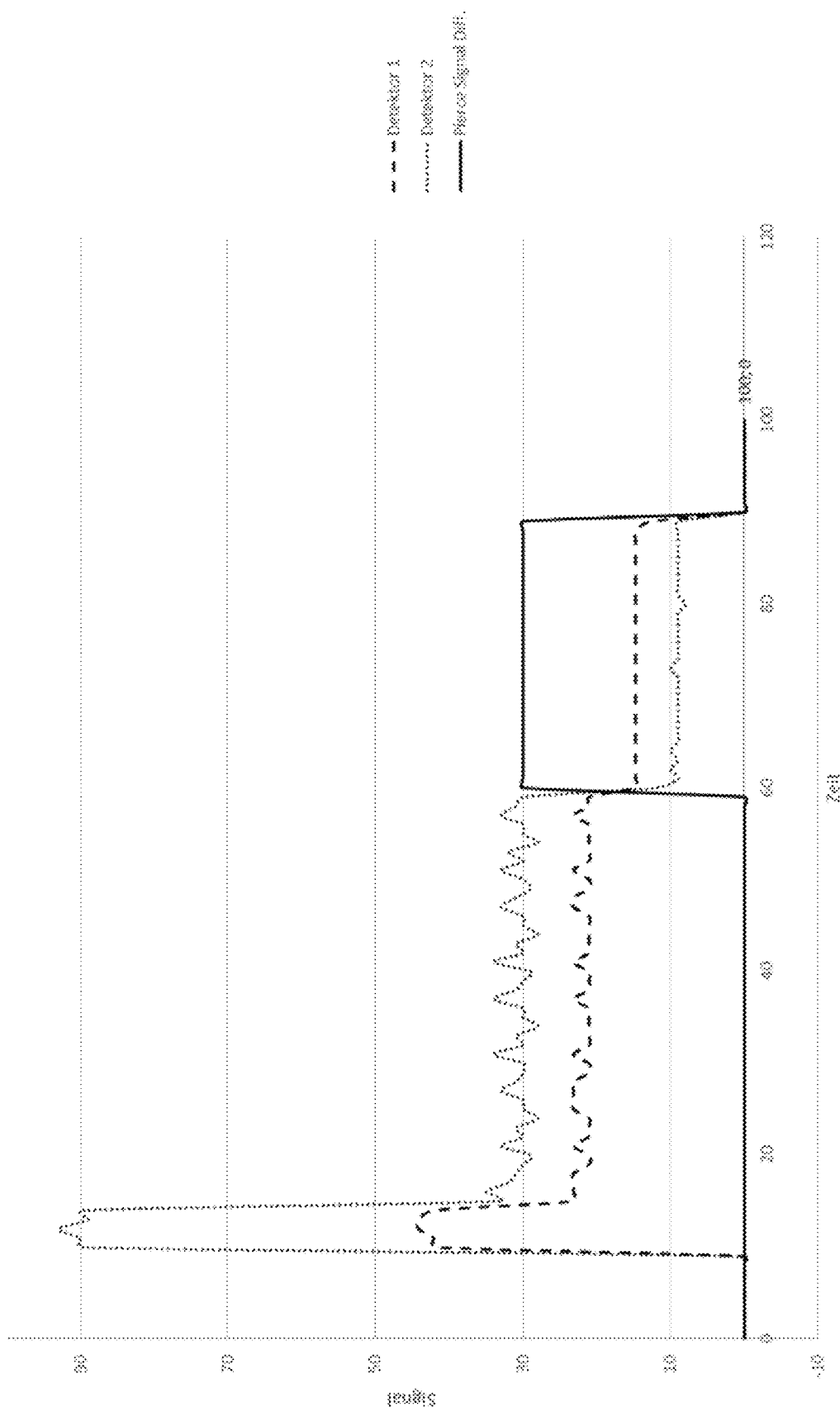
FIG. 3 shows signal characteristics of a fiber optic cable piercing detector with adapted amplification of the first detector in cw mode.
Figure 4:
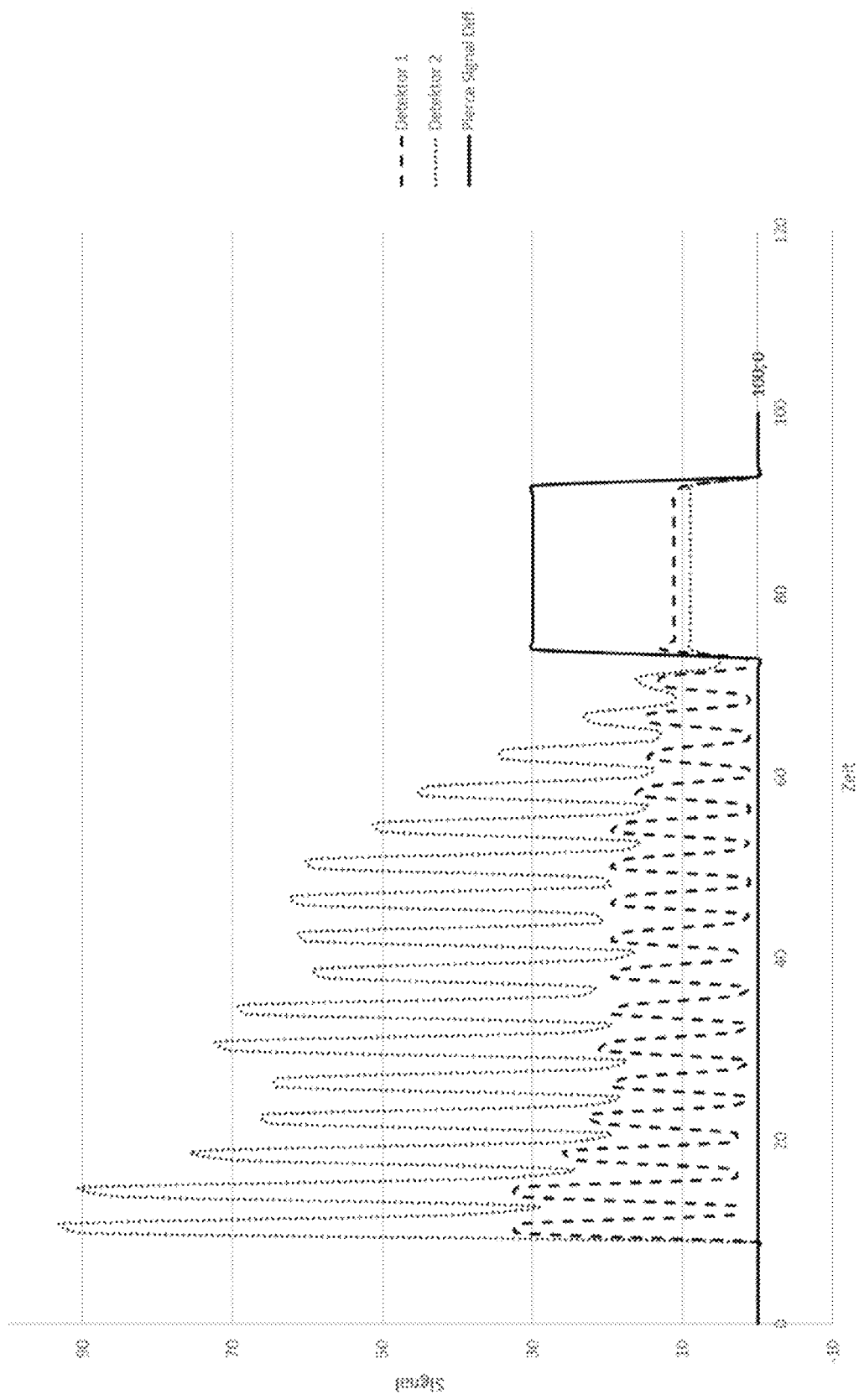
FIG. 4 shows signal characteristics of a fiber optic cable piercing detector with adjusted gain of the first detector in pulse mode.
Figure 5:
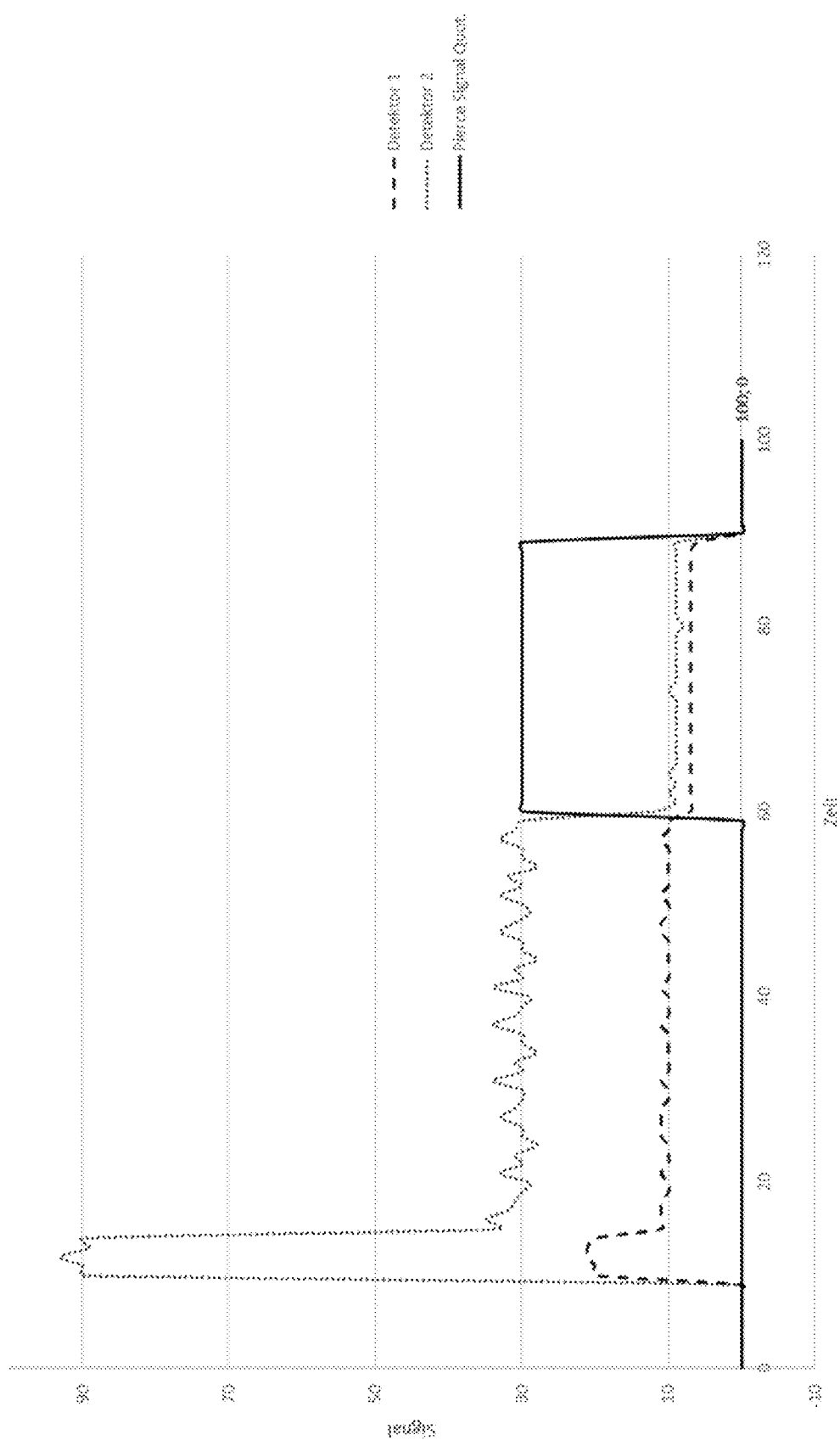
FIG. 5 shows signal characteristics of the LLK Piercing Detector in cw mode.
Figure 6:
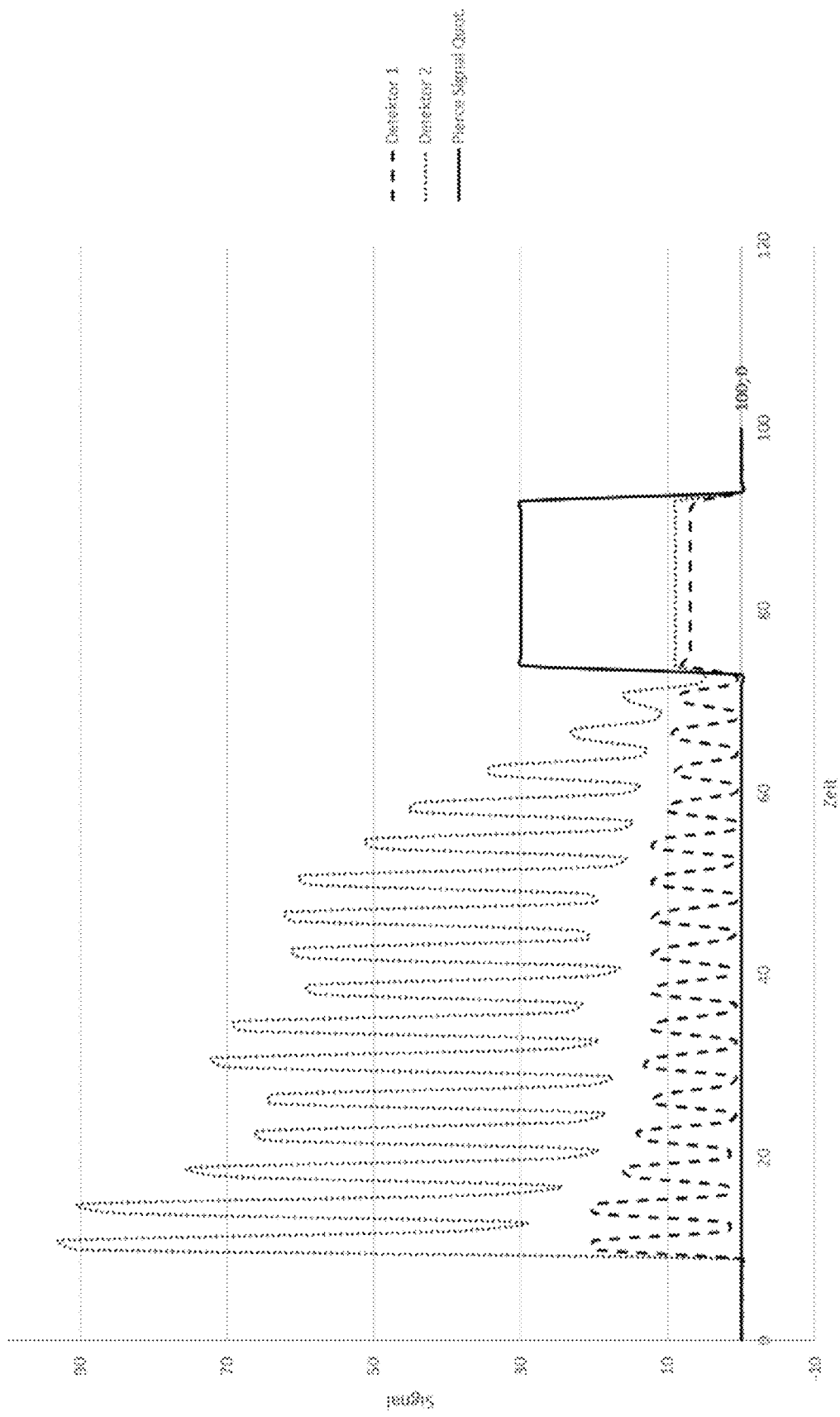
FIG. 6 shows signal characteristics of the LLK Piercing Detector in pulse mode.

A simple analog circuit with operational amplifiers is recommended for evaluation. By means of a suitable pre-amplification of the signals and a comparator circuit a signal course for a piercing detection, as shown in FIG. 3 and FIG. 4, could be realized. The setting of a threshold value is done via the amplification factors. A signal curve for a piercing detection by means of quotient formation of both signals is shown in FIG. 5 and FIG. 6. The threshold value would be set by the quotient. Since the evaluation is analog, there is no need for complex computing power and fast BUS systems. Only the threshold value is configured digitally via the LLK-internal BUS. However, this can now be considerably slower and does not have to maintain a 10 ms clock rate. For the feedback of the piercing signal the output of the comparator can be used for example.

In order not to impair the installation space for cooling the absorber area of the fiber optic cable connector and to avoid unnecessary temperature fluctuations of the sensor, it is advisable to arrange the second photodetector 7 also in the rear area of the fiber optic cable connector in such a way that it is shielded against stray light from the rear connector area and temperature influences from the front area by means of a detector shield 4 (FIG. 1).

The supply of scattered light from the absorber area is conveniently made through an opening 9, which is not concentric with the optical fiber (FIG. 1). Only a non-concentric arrangement of the opening allows light to be transported without affecting the bonding/mounting of the useful light-carrying optical fiber. This also allows heat to continue to be dissipated from this bonded area. If, for example, a capillary is used which is arranged concentrically to the useful light conducting optical fiber, the fiber bonding is inevitably thermally insulated. This significantly limits the use of the fiber optic cable for high and highest laser powers. It is particularly advantageous to seal this opening with a transparent material, such as glass, or another optical fiber to prevent dust or similar from entering the absorber area. Since even the slightest deposits of dust or other dirt on the sheathing area of the optical fiber in the absorber area would lead directly to the failure of the entire optical cable, the tight sealing of this opening is essential for the long-term function of the optical cable.

The foregoing description of the preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments as are suited to the particular use contemplated. It is intended that the scope of the invention be defined by the claims appended hereto, and their equivalents. The entirety of each of the aforementioned documents is incorporated by reference herein.

REFERENCE NUMERALS 1 fiber optic cable protection tube
2 scattered light at the first detector 6
3 housing
4 detector shield
5 process scattered light at the second detector 7
6 first detector
7 second detector
8 fiber bond
9 opening for process scattered light 5
10 cooling water supply
11 cooling water return
12 optical fiber
13 fiber centering device
14 useful radiation
15 absorber area
16 process scattered light deducted from optical fiber
17 process scattered radiation
18 optical systems of the processing optics
19 workpiece surface
20 focused laser beam

What is claimed is:

1. A device for detecting a piercing signal during a laser cutting process of a workpiece, comprising
a fiber-optic cable for radiating the workpiece;
a fiber-optic cable connector connected to the fiber-optic cable;
an aperture within the fiber-optic cable connector for separating first radiation arriving at an output end of the fiber-optic cable and second radiation reflected back from the workpiece;
at least two photodetectors, a first of the at least two photodetectors being configured to measure the first radiation behind the aperture which arrives at the output end of the fiber-optic cable, a second of the at least two photodetectors being configured to measure the second radiation in front of the aperture which is reflected back from the workpiece, wherein the first and second radiation measured by the first and second photodetectors is used to generate the piercing signal.

2. The device of claim 1, further comprising a circuit for the correlation of the measured first and second radiation for the detection of a laser piercing process.

3. The device of claim 2, wherein the circuit for the correlation of the measured first and second radiation is arranged within the fiber-optic cable connector.

4. The device according to claim 2, wherein the circuit for correlating the measured first and second radiation is a comparator circuit.

5. The device according to claim 2, wherein the circuit for correlation of the measured first and second radiation is connected to a signal conductor.

6. The device according to claim 5, wherein the signal conductor is a BUS system.

7. The device according to claim 5, wherein the signal conductor and/or BUS system is connected to a control unit of the laser cutting process.

8. The device according to claim 1, wherein the output end of the fiber-optic cable comprises an optical element disposed in the aperture; and wherein the second photodetector is disposed in a rear part of the fiber-optic cable connector, the second photodetector being configured to measure the second radiation in front of the aperture via an opening that is not arranged concentrically to the optical element.

9. The device of claim 8, wherein the opening is closed with an optically transparent element to prevent dust or moisture from entering the fiber optic cable connector.

10. The device of claim 8, wherein the optical element is an optical fiber, a lens, or a glass cylinder.

11. The device of claim 1, wherein the output end of the fiber-optic cable comprises an optical fiber disposed in the aperture; and wherein the first photodetector is disposed in a rear part of the fiber-optic cable connector behind the aperture and adjacent to the optical fiber.

12. The device of claim 11, comprising an adhesive bonding or a holding device disposed between the optical fiber and the aperture.

13. The device of claim 11, wherein the second photodetector is disposed in the rear part of the fiber-optic cable connector; and wherein the fiber-optic cable connector defines an opening adjacent to the aperture, the opening being configured to conduct the second radiation in front of the aperture to the rear part of the fiber-optic cable connector.

14. The device of claim 13, wherein the second photodetector is disposed in a shield in the rear part of the fiber-optic cable connector, the shield separating the first and second radiation from one another in the rear-part of the fiber-optic cable connector.

15. The device of claim 13, wherein the opening comprises an optically transparent element disposed therein and configured to prevent dust or moisture from entering the rear part of the fiber optic cable connector.

16. A method for determining a piercing signal during a laser cutting process of a workpiece, comprising the steps:
measuring first radiation arriving at an output end of a fiber-optic cable connected to a fiber-optic cable connector by means of a first photodetector, the first photodetector being behind an aperture located inside the fiber-optic cable connector;
measuring second radiation in front of the aperture reflected back from the workpiece by means of a second photodetector; and
generating the piercing signal using the first and second radiation measured by the first and second photodetectors.

17. The method of claim 16, comprising the step of correlating signals of the measured first and second radiation of the first and second photodetectors in the fiber-optic cable connector by means of a comparator circuit.

18. The method of claim 17, comprising feeding a result of the correlation of the signal of the measured first and second radiation in front of and behind the aperture by means of a first signal conductor to a control unit of the laser cutting process.

19. The method of claim 18, wherein the first signal conductor is a BUS system.

20. The method of claim 18, wherein the control unit controls the laser cutting process depending on the transmitted signal.

21. The method of claim 16, wherein the process uses an adhesive bonding or holding device for an optical fiber of the fiber-optic cable to be supplied with radiation.

22. The method according to claim 16, wherein the piercing signal is transmitted by means of a second signal conductor within the fiber-optic cable.

* * * * *